United States Patent [19]

Grapes et al.

[11] 4,194,224
[45] Mar. 18, 1980

[54] DISK INDICATOR AND EJECTOR

[75] Inventors: Robert D. Grapes, Oklahoma City; Donald J. Watson, Bethany, both of Okla.

[73] Assignee: Magnetic Peripherals Inc., Minneapolis, Minn.

[21] Appl. No.: 939,007

[22] Filed: Sep. 1, 1978

[51] Int. Cl.$^2$ .............................................. G11B 17/02
[52] U.S. Cl. ...................................................... 360/97
[58] Field of Search .................................... 360/97, 99

[56] References Cited

U.S. PATENT DOCUMENTS

| | | | |
|---|---|---|---|
| 3,890,643 | 6/1975 | Dalziel | 360/99 |
| 4,139,876 | 2/1979 | Owens | 360/97 |

*Primary Examiner*—Robert S. Tupper
*Attorney, Agent, or Firm*—Frederick W. Niebuhr

[57] ABSTRACT

A disk indicator and ejector for a disk drive mechanism including a base and a clamshell assembly mounted to the base to pivot between an open position for receiving a disk cartridge, and a closed position for drivably engaging it. The indicator and ejector includes a linking member mounted slideably with respect to the base. A cartridge inserted into the mechanism contacts the linking member, moving it inwardly against the force of a tension spring. Simultaneously, a latch rotatably mounted to the linking member contacts a latch block and is thereby rotated against a torsion spring. As the cartridge reaches its centered position, the linking member engages a pin mounted on the clamshell assembly, indicating complete insertion. The clamshell assembly is then closed, moving the pin and linking member further inward and free of the cartridge, and setting the latch in a cocked position. To eject the cartridge, the clamshell is re-opened to move the pin and linking member outward, causing the latch to rotate from the cocked position and lift the linking member free of the pin. The linking member, responsive to the tension spring, then ejects the cartridge.

6 Claims, 8 Drawing Figures

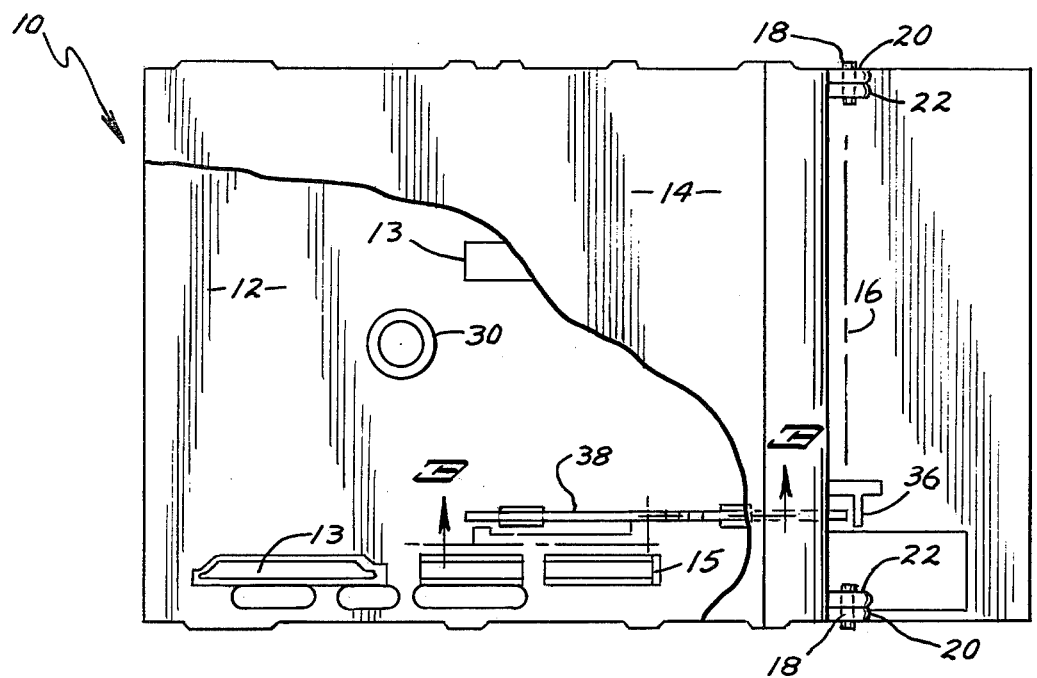
FIG. 1
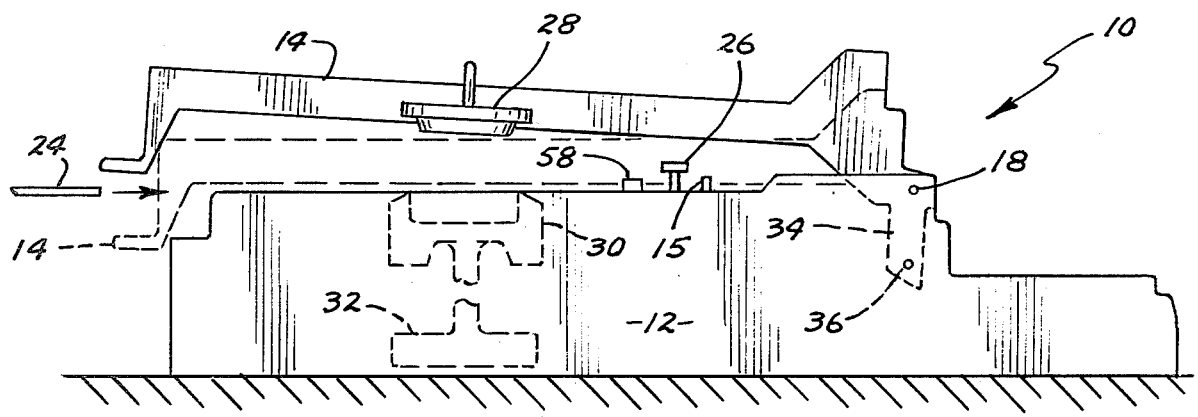
FIG. 2
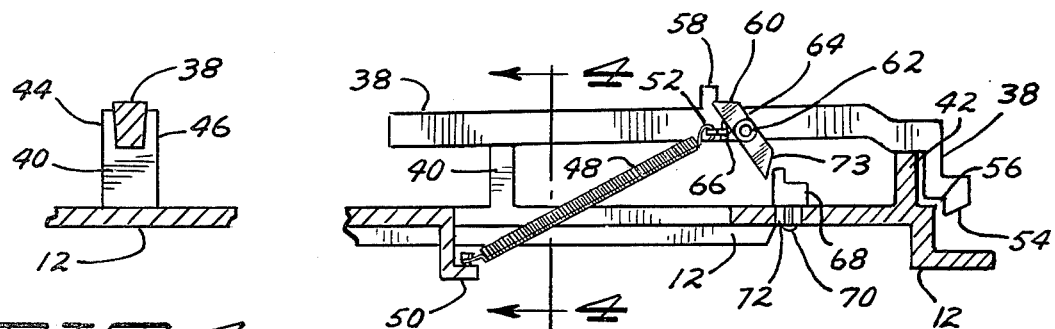
FIG. 4
FIG. 3

DISK INDICATOR AND EJECTOR

BACKGROUND OF THE INVENTION

The floppy disk or diskette is a well-known device for storage and retrieval of electronic data. The disk is typically a plastic such as Mylar polyester film, with a diameter of approximately 20 cm and a thickness of approximately 0.08 mm, having at its center a drive hole. It is permanently enclosed in and supported by a jacket of stiff paper or plastic. The jacket has two openings: a central opening corresponding to the drive hole and a radial opening through which the disk recording surface is exposed to a transducer or read/write head.

The disk and jacket together form a disk cartridge adapted for mounting in a disk drive mechanism. The disk is rotated in the mechanism while the jacket is stationary. The head, positioned over the jacket radial opening in contact with the disk surface, is movable radially thereof. In practice, disk cartridges are used interchangeably in one disk drive mechanism, with each cartridge inserted and removed many times. It is therefore desirable that insertion and removal be accomplished easily, without damage to the disk and at a minimum of contamination from dust particles and the like.

It has been found advantageous to include means in a disk drive mechanism to aid initial positioning and removal of a disk. U.S. Pat. No. 4,040,107 to Bryer granted Aug. 2, 1977, shows a cam operated positioning and ejection control. A simpler control means including a spring-loaded ejector is found in a recording apparatus for vehicles disclosed in U.S. Pat. No. 3,281,854 to Fiehn granted Oct. 25, 1966. The principle is applied to disk drives in U.S. Pat. No. 3,940,793 to Bleiman granted Feb. 24, 1976, wherein a spring-mounted ejector member is engaged by the leading edge of a disk cartridge and, upon complete insertion, urges the cartridge trailing edge against a positioning surface. U.S. Pat. No. 3,890,643 to Dalziel granted June 17, 1975 shows a cartridge loading apparatus in which an ejector mechanism is cocked upon cartridge insertion slightly farther than is necessary for centering. As the apparatus is closed following insertion, camming surfaces force the cartridge into the centered position.

These structures, while aiding the insertion and ejection of a cartridge, can interfere with disk centering, driving, or both. The ejector mechanisms of Feihn and Bleiman contact the cartridge throughout operation, and thus can interfere with disk rotation and centering if not accurately machined. The Dalziel device depends upon movement of the cartridge relative to the loading apparatus as it is closed. Consequently rapid closure may cause premature clamping of the disk before it is centered.

SUMMARY OF THE INVENTION

The invention relates to a means for indicating the approximate centering of a disk cartridge inserted into a disk drive mechanism, and ejecting the cartridge from the mechanism.

The invention is embodied in a disk drive apparatus comprising a housing adapted to receive a disk cartridge and drivingly engage the same. A base of the housing has guide means for maintaining the cartridge substantially in a selected plane as it is inserted into the housing. A clamshell assembly is pivotally mounted to the base and moves between an open position and a closed position. When open, the housing is adapted to receive the cartridge. After insertion, the clamshell assembly is pivoted to the closed position to drivably engage the disk within the housing.

A linking member is supported with respect to the base for movement generally in the direction of cartridge insertion. The linking member disclosed is supported by two forked standards for sliding movement over the base. A biasing means, herein a tension spring anchored to the base and linking member, continually urges the linking member outwardly while a stop means prevents its movement outward beyond a first position. A fastening means is mounted to the linking member.

A linking means also is mounted to the linking member and positioned to contact the leading edge of the disk cartridge before it is centered. Continued insertion after contact forces the linking member inwardly from the first position against the force of the biasing means.

With the clamshell assembly open, a locking means mounted thereto is positioned for engagement with the fastening means when the cartridge is inserted proximate the centered position. The fastening and locking means, when engaged, retain the linking member at an initial linking position against the force of the biasing means. The clamshell assembly is then closed, moving the locking means further inward and in turn moving the linking member further inward to a final linking position. The cartridge, remaining at its approximately centered position, is then free of the linking means.

Means can be provided for disengaging the fastening means from the locking means upon movement of the clamshell assembly from the closed position toward the open position. As described, such means includes a latch mounted rotatably on the linking member and a torsion spring continually biasing the latch to a first latch position against a latch stop. As the cartridge is inserted and the linking member moved inward, the latch contacts a latch block mounted to the base and is rotated against the torsion spring. During closure of the clamshell assembly, the latch rotates responsive to the torsion spring to a cocked position against the latch block. As long as the housing is closed, the latch remains cocked. However, as the clamshell assembly is moved toward the open position, the torsion spring causes the latch to rotate toward the first latch position, thereby freeing the fastening means from the locking means and allowing the linking member, resonsive to the tension spring, to eject the cartridge.

Important features of the invention reside in the positioning of the locking means and its mounting to the clamshell assembly. Since it engages the fastening means substantially at cartridge centering, such centering can be perceived with the sense of touch and by the audible clicking sound of engagement, without visual inspection. Moreover, final positioning of the linking member is effected simply by closing the clamshell. The linking member is set without any additional operator effort. As the linking member is entirely free from the cartridge when the clamshell assembly is closed, the indicator and ejector mechanism does not interfere in any respect with proper centering of the disk or with its rotation during operation.

BRIEF DESCRIPTION OF THE DRAWINGS

Other features and advantages of the invention will become apparent upon reading the following detailed description and upon reference to the drawings, in which:

FIG. 1 is a top plan view of a disk drive mechanism constructed in accordance with the invention, with parts broken away to enhance clarity in illustration;

FIG. 2 is a side elevation of the disk drive mechanism;

FIG. 3 is an enlarged sectional view taken along the line 3—3 in FIG. 1;

FIG. 4 is a sectional view taken along the line 4—4 in FIG. 3;

DETAILED DESCRIPTION OF THE PREFERRED EMBODIMENT

Figure 5:
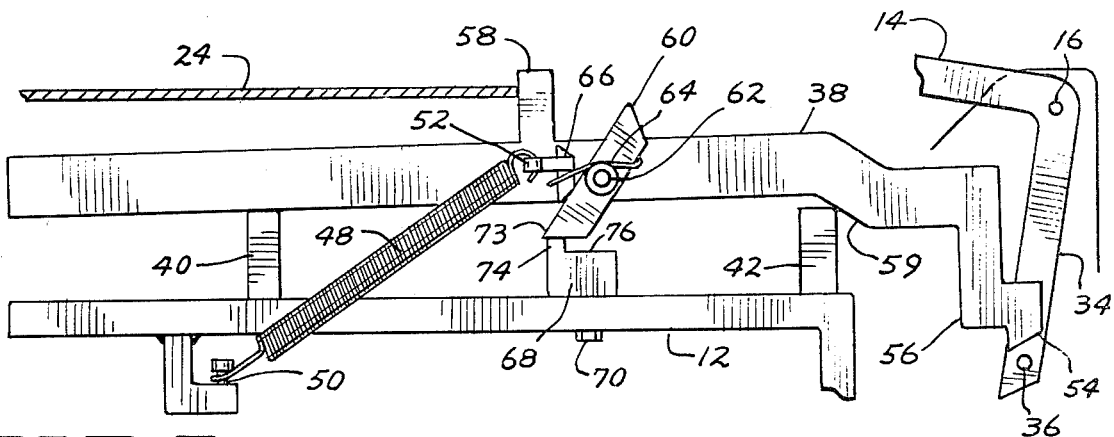
FIG. 5 is an enlarged section view taken along the line 3—3 in FIG. 1 schematically illustrating partial insertion of a disk cartridge into the open mechanism.

Referring to the drawings, there is shown in FIGS. 1 and 2 a disk drive mechanism 10. A housing of drive mechanism 10 incudes a base 12 having a plurality of risers 13 and backstops 15 to support a disk cartridge in a selected horizontal plane and guide it as it is inserted. The housing further comrises a clamshell assembly including a clamshell 14 mounted to the base at a pivot axis 16. The axis is defined by two coaxial pivot pins 18, each inserted through apertures in adjacent lug pairs including a base lug 20 and a clamshell lug 22. Clamshell 14 can pivot relative to the base between an open position shown by the solid lines in FIG. 2, and a closed position represented by broken lines. In the open position, clamshell 14 and base 12 define a slot at a first or forward end of mechanism 10, through which a disk cartridge 24 can be inserted into the housing as indicated by the arrow in FIG. 2.

Disk cartridge 24 includes a floppy disk or diskett of a plastic such as Mylar, flat and circular with a thickness of 0.08 mm, and having at its center a drive hole. The disk is permanently enclosed in a jacket of plastic or stiff paper. The jacket has a central opening corresponding to the drive hole and a radial opening through which a transducer or read/write head 26, mounted to base 12, can communicate directly with the disk surface.

After cartridge 24 is inserted into the housing, clamshell 14 is moved to the closed position whereupon a clamping cone 28, supported by the clamshell, passes through the drive hole and clamps the disk inner rim to a drive spindle 30. A drive means, for example an electric motor 32, is drivably connected to the spindle and is adapted to rotate the disk when the same is clamped to spindle 30.

Between the open and closed positions, clamshell 14 traverses an arc of approximately 7 degrees with respect to base 12. One purpose for limiting the arc traversed and thus the size of the slot admitting cartridge 24 to the housing, is to minimize contamination from dust particles and the like which can interfere with the operation of transducer 26. Restricting the upward rotation of clamshell 14 increases the difficulty of manually inserting cartridge 24 and visually monitoring disk insertion.

Thus, a means is provided for determining when the cartridge is approximately centered so that clamshell 14 may be closed with a reasonable certainty that cone 28 will enter the drive hole rather than contact and damage the disk. A leg 34 depends downwardly from clamshell 14 and a locking pin 36 is extended horizontally from leg 34, for pivoting about axis 16 along with clamshell 14. Cooperating with pin 36 is a linking member 38 mounted movably with respect to base 12.

As seen from FIG. 3, base 12 includes a first forked standard 40 and a second forked standard 42 which support linking member 38 for longitudinal sliding movement in the direction of cartridge insertion and ejection, i.e., movement inward and outward. In FIG. 4 first standard 40 is shown to include first and second prongs 44 and 46, oppositely inclined to engage the beveled surface of linking member 38 and substantially prevent rotational or transverse movement.

FIG. 3 shows linking member 38 at a first position comprising its normal location with respect to the base when the housing contains no disk cartridge. Supported by standards 40 and 42, linking means 38 is continuously biased toward the first end of the housing. The biasing means includes a spring 48 in tension, mounted at one end to a first spring member 50 on base 12 and connected at the other end to a second spring anchor 52 integral with the linking member. At the inward end of linking member 38 is a hook 54 and a heel 56. The heel and standard 42 can contact one another as shown in FIG. 3 to form a stop means for preventing movement of member 38 outward beyond the first position in response to spring 48. The linking member includes a tab 58 extending upwardly a sufficient distance to intersect the plane of insertion of disk cartridge 24, and located sufficiently outward (leftward as viewed in FIG. 3) so that before cartridge 24 reaches its centered position within the housing, its leading edge contacts tab 58. A ramp 59 of linking member 38 is most clearly seen in FIGS. 5-8.

A trapezoidal latch 60 is rotatably mounted to linking member 38 through a latch axle 62, and continously biased in the counterclockwise direction as viewed in FIG. 3 by a torsion spring 64. A detent or stop 66, mounted to the linking member, prevents latch 60 from rotating past a first latch position shown in FIG. 3., which is the normal position for latch 60 when no disk is contained in the housing. A latch block 58 is adjustably mounted to base 12 by a bolt 70 connected to the latch block through an elongate slot 72 in the base.

The operation of the indicator ejector means is best understood in viewing FIGS. 3 and 5-8, which show parts of base 12 and clamshell 14 to locate pivot axis 16 and locking pin 36 with respect to linking member 38. In FIGS. 5-8, cartridge 24 appears elevated above linking member 38 since risers 13 supporting it are not shown.

With the mechanism configured as in FIG. 3, disk cartridge 24 is inserted by hand into the housing and moved inward (to the right) toward a centered position. Before cartridge 24 is centered, its leading edge engages tab 58. Further inward movement of the cartridge moves linking member 38 inward against the force of spring 48.

As seen from FIG. 3, linking member 38 moves only a slight distance inward before a lower tip 73 of latch 60 contacts a latch point 74 of latch block 68. Continued inward movement of linking member 38 causes latch 60 to rotate clockwise against the force of torsion spring 64 until latch 60 abuts stop 66 in a position shown in FIG. 5 with lower tip 73 on latch point 74. The inward portion of linking member 38 is supported at a slightly raised position by ramp 59 on standard 42 keeping hook 54 above locking pin 36.

Consequently, as linking member 38 is moved further inward, hook 54 passes above locking pin 36. Sufficient inward movement of the linking member moves ramp 59 inward beyond standard 42, preferably at or slightly after movement of hook 54 beyond the locking pin. This permits hook 54 to engage the locking pin with a clicking noise which indicates that disk cartridge 24 is at least approximately centered in the housing. Finger pressure is then released, typically allowing a slight outward movement by linking member 38 until hook 54 and locking pin 36 are positively engaged. When so engaged, the pin and hook provide a locking means for maintaining linking member 38 in an initial linking position shown in FIG. 6, counter to spring 48.

Figure 6:
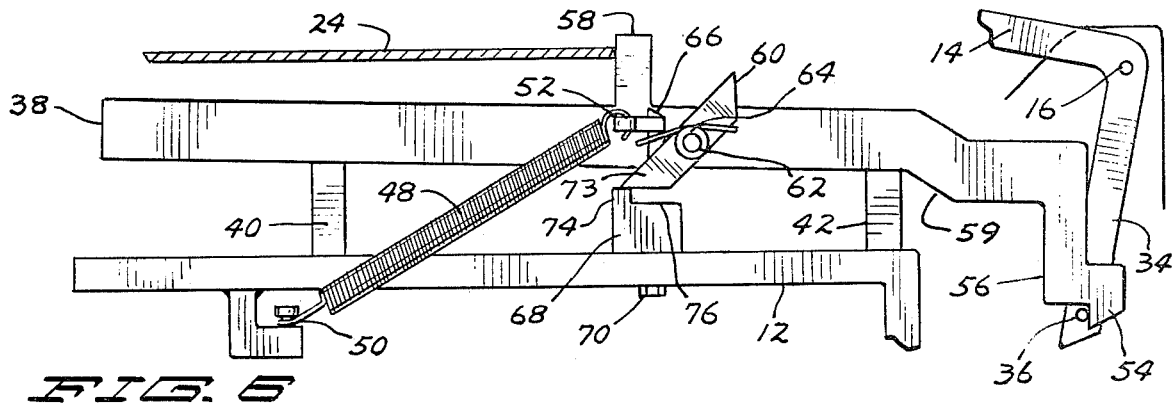
FIG. 6 is a sectional view similar to the view of FIG. 5 schematically showing complete insertion of the cartridge.
Figure 7:
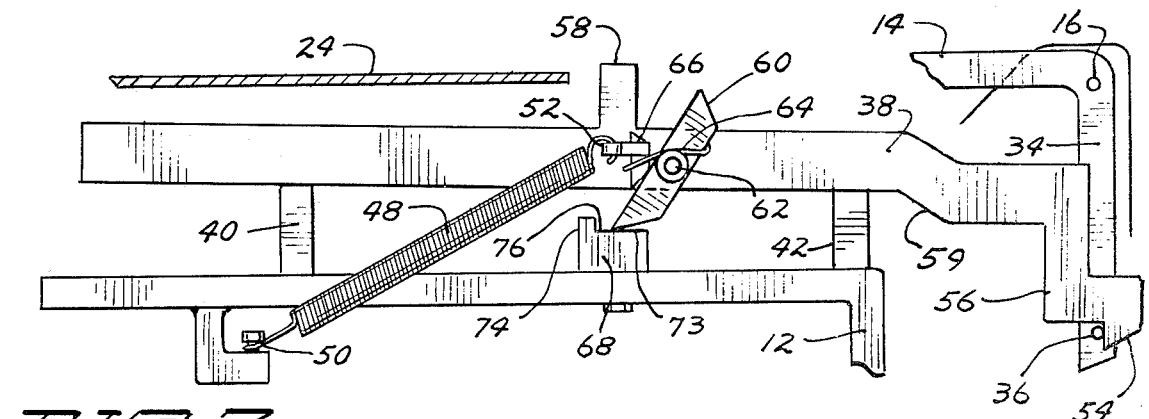
FIG. 7 is a sectional view similar to that of FIG. 5 schematically showing the mechanism closed.

Comparison of FIGS. 6 and 7 illustrates linking member movement in response to the closing of clamshell 14. Locking pin 36 follows the seven degree arc traversed by the clamshell during closure, resulting in its generally inward (righward) movement. With locking pin 36 and hook 54 engaged, the pin moves linking member 38 inward to a final linking position shown in FIG. 7. Simultaneously latch 60 is moved inward beyond latch point 74 and rotates counter clockwise until tip 73 engages a latching surface 76. Disk cartridge 24 remains stationary during closure and thus is completely free of tab 58 (and all other parts of the indicator ejector assembly) upon movement of clamshell 14 toward the closed position.

One advantage in separating the assembly from cartridge 24 is that the cartridge is free to move in response to a more accurate centering means, for example clamping cone 28. During operating of disk drive mechanism 10 there is no tendency in linking member 38 to urge the jacket against the disk, to cause binding, off-center rotation or to otherwise interfere with disk rotation. Movement from the initial linking position in FIG. 6 to the final linking position in FIG. 7 is accomplished merely by moving clamshell 14 from the open to the closed position; that is, simply by closing the housing of mechanism 10. As closure would be required in any event, an operator can set the ejector indicator assembly without performing any steps additional to those required in its absence.

Ejection of disk cartridge 24 is automatic upon moving clamshell 14 from the closed position to the open position. This rotates locking pin 36 clockwise seven degrees, allowing linking member 38 to move outward responsive to spring 48. Linking member movement is the reverse of that during closure, with one important exception: when lower tip 73 of latch 60 abuts latch point 74, outward movement of the linking member is momentarily resisted while locking pin 36 continues its generally outward movement. Hook 54 and locking pin 36 are then no longer frictionally engaged, permitting linking member 38 to move in response to spring 48. The linking member moves upward as well as outward due to latch 60, which rotates counterclockwise in response mainly to tension spring 48 but also responsive to torsion spring 64.

Figure 8:
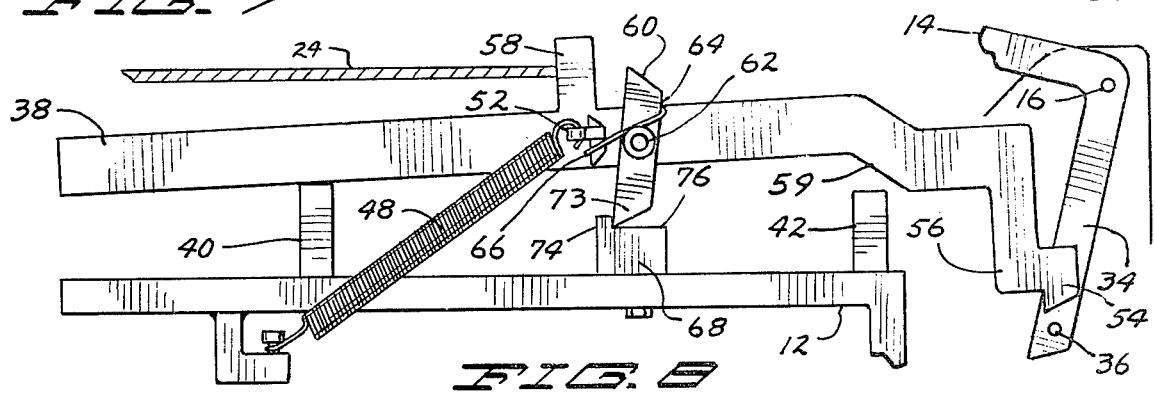
FIG. 8 is a sectional view similar to that of FIG. 5 schematically showing ejection of the cartridge.

As seen in FIG. 8, latch rotation tends to raise the inward portion of linking member 38, particularly hook 54, free of locking pin 36. It is understood that the configuration in FIG. 8 is unstable, and that spring 48 continues to pull linking member 58 outward. Simultaneously, torsion spring 64 continues to rotate latch 60 counterclockwise until it abuts stop 66. Linking member 38 moves outward in response to spring 48 until heel 56 abuts standard 42 as shown in FIG. 3. Meanwhile, substantially before the heel abuts standard 42, tab 58 contacts the leading edge of disk cartridge 24 and rapidly projects cartridge 24 outward through the slot created by the immediately proceeding opening of clamshell 14. The outermost portion of disk cartridge 24 is then outside the housing and is quite easily removed by hand, minimizing the possibility of damage from reaching into the housing.

Early release of linking member 38 from the final linking position enhances positive ejection of disk cartridge 24, as the linking member can gain momentum prior to contact with the cartridge. Moreover, the time lag between disengagement and tab-cartridge contact guarantees that clamping cone 28 is clear of the cartridge before linking member 38 begins to eject it. This avoids drive mechanism or cartridge damage caused by an ejector mechanism operating prematurely to drive a cartridge against the clamping cone.

Thus, the invention provides a disk indicator and ejector assembly which allows easier initial placement and approximate centering of a disk cartridge, frees the disk for accurate centering in response to more accurate and delicate centering means, avoids interference with the cartridge when the drive mechanism is in use, and finally insures a positive and safe ejection of the cartridge, all without requiring any attention in addition to that normally given a disk drive having no ejector mechanism. The simple design insures trouble free operation over many cartridge insertions and ejections.

What is claimed is:

1. Disk drive apparatus having a housing adapted to receive a disk cartridge for digital insertion to a substantially centered position within the housing, said housing including a base, guide means mounted to the base for maintaining said cartridge substantially in a selected plane as it is so inserted, and a clamshell assembly including a clamshell mounted to the base for movement between an open position to receive said disk cartridge and a closed position to drivably engage the cartridge; wherein the improvement comprises:

a linking member supported with respect to the base for inward and outward movement generally in the direction of said digital insertion; biasing means for urging outward movement of the linking member; stop means for preventing movement of said linking member outward beyond a first position; linking means mounted to the linking member and positioned to contact the leading edge of said cartridge during said insertion and before the cartridge reaches said centered position, further cartridge insertion after such contact moving said linking member inwardly from said first position against the force of said biasing means; fastening means mounted to the linking member; and a locking pin mounted to the clamshell and, with said clamshell open, positioned so that it is engaged by said fastening means substantially as the cartridge reaches said centered position, thereby retaining the linking member at an initial linking position against the force of said biasing means, movement of said clamshell from the open position to the closed position after such engagement moving said locking pin inward thereby moving said linking member to a final linking position wherein said linking means is free of said cartridge.

2. The aparatus of claim 1 including: means for disengaging the fastening means from the locking pin upon movement of said clamshell from the closed position toward the open position.

3. The apparatus of claim 2 wherein:

said means for disengaging the fastening means from the locking pin includes a latch mounted rotatably with respect to the linking member, spring means biasing said latch toward a first latch position, detent means preventing said latch from rotating beyond said first latch position in response to the spring means, and a latch block mounted to the base and positioned so that it is engaged by one end of the latch during said insertion thereby to cause rotation of the latch against the force of said spring means to a cocked position and to retain the latch in the cocked position as the linking member is moved to its final linking position, subsequent movement of the clamshell from the closed position toward the open position allowing return rotation of the latch toward said first latch position responsive to said spring means, said return rotation moving the linking member away from the latch block thereby disengaging the fastening means from said locking pin.

4. The apparatus of claim 3 wherein:

said fastening means includes a hook integral with said linking member and located at an inside end thereof.

5. The apparatus of claim 1 wherein:

said biasing means includes a spring in tension fastened at one end to the linking member and at the other end to the base; and wherein said stop means includes a heel of said linking member and a portion of said base adapted to abut said heel.

6. The apparatus claim 1 wherein:

said linking means comprises a tab extended from said linking member and integral therewith.

* * * * *